United States Patent [19]

Schwegler

[11] Patent Number: 5,792,231
[45] Date of Patent: Aug. 11, 1998

[54] BAFFLE ASSEMBLY

[75] Inventor: Rudolf Schwegler, Küsnacht, Switzerland

[73] Assignee: Emhart Glass Machinery Investments Inc., Newark, Del.

[21] Appl. No.: 954,719

[22] Filed: Oct. 20, 1997

[30] Foreign Application Priority Data

Oct. 24, 1996 [GB] United Kingdom ............... 9622150

[51] Int. Cl.$^6$ ............................................. C03B 7/00
[52] U.S. Cl. ............... 65/207; 65/209; 65/219; 65/229; 65/233; 65/234; 65/261; 65/300
[58] Field of Search ............... 65/207, 209, 219, 65/229, 233, 234, 261, 300

[56]  References Cited

U.S. PATENT DOCUMENTS

| | | | |
|---|---|---|---|
| 3,357,810 | 12/1967 | Crouse | 65/234 |
| 4,444,578 | 4/1984 | Marroquin | 65/209 |
| 4,466,821 | 8/1984 | Irwin et al. | |
| 4,470,836 | 9/1984 | Delgadillo et al. | 65/209 |
| 4,509,969 | 4/1985 | Abbott | 65/300 |
| 4,678,494 | 7/1987 | Nebelung et al. | |

FOREIGN PATENT DOCUMENTS

| | | | |
|---|---|---|---|
| 233506 | 5/1987 | European Pat. Off. | 65/103 |
| 2446597 | 4/1975 | Germany | 65/233 |
| 8198630 | 8/1996 | Japan . | |
| 2182624 | 5/1987 | United Kingdom | 65/103 |

Primary Examiner—Stanley S. Silverman
Assistant Examiner—Michael P. Colaianni
Attorney, Agent, or Firm—Spencer T. Smith

[57]  ABSTRACT

A baffle assembly for use in a glassware forming machine to provide a settle blow to settle a gob in a parison forming mould cavity and a mould closing surface to close the mould cavity comprises a first member which comprises a mould cavity closing surface and settle blow air passages opening to positions spaced from the mould closing surface, and a second cup shaped member mounted on the first member for axial movement between an extended position and a second position in which a circumferential locating surface on the second member is substantially level with the end surface of the baffle head.

3 Claims, 2 Drawing Sheets

BAFFLE ASSEMBLY

The present invention relates to improvements in baffle assemblies for use in glassware forming machines.

BACKGROUND TO THE INVENTION

In the well-known and widely used I.S. (individual section) glassware forming machine, a gob of molten glass is provided to a parison mould at a blank station, is formed into a parison, is transferred to a blow mould and is blown into a container of the desired shape.

Formation of a parison is usually carried out either by a plunger (the press and blow process) or by air pressure (the blow and blow process).

Conventionally, in a section of an I.S. machine carrying out the blow and blow process, there is provided at the blank station, at which the parison mould is positioned, a funnel mechanism and a baffle mechanism. In the operation of the section, the funnel mechanism brings a funnel from an out of the way position into an operative position against the parison mould, a gob of glass is provided to the parison mould, passing through the funnel, the baffle mechanism brings a baffle into operative position in contact with the funnel, settle blow air is provided from the baffle through the funnel into the parison mould cavity to blow the gob of glass into proper contact with a lower, neckring, portion of the parison mould cavity, the baffle is lifted to allow the funnel to be removed, the baffle is lowered into contact with the parison mould to close the end of the parison mould cavity with a mould cavity end closing surface portion of the baffle, and the gob of glass is then formed into a parison by blowing.

It will be realised that, if the funnel can be dispensed with, considerable time savings can be achieved. However if a baffle when in position against the parison mould is to be used both for providing the settle blow and the mould cavity end closing surface, it is necessary to provide for passage of the settle blow air through the mould cavity end closing surface of the baffle. This necessarily entails providing discontinuities in the end closing surface, which may give rise to defects in the end surface of the parison, and consequently to defects in the resultant glass container.

A baffle assembly of the type described which is currently used comprises a settle blow air passage which leads to the mould cavity end closing surface of the mould, a valve being provided which has a conical end portion; when settle blow is required the valve is opened, and when moulding takes place the conical end portion of the valve is in a closed position in which an end face provides a portion of the mould cavity end closing surface. It is difficult, with this construction, to avoid creation of imperfections on the end of the parison where the molten glass contacts the periphery of the end portion of the valve—also the end portion having sharp edges, is easily damaged which increases the problem.

Japanese Patent Application No 8198630 discloses a baffle assembly to provide a settle blow to settle a gob in a parison forming mould cavity and a mould closing surface to close the mould cavity comprising a single baffle member having an end surface with a mould cavity closing surface portion and settle blow air passages opening to positions spaced from the mould cavity closing portion and adapted to be connected to an air supply. An end portion of the baffle member has a part conical surface into which the settle blow air passages open, and the parison mould cavity is formed by two parison mould members which are provided with corresponding part conical surfaces. In operation of the baffle assembly, the baffle is moved into a first position in which the conical surfaces on the mould members are spaced from the conical surface on the baffle member, thus allowing settle blow to be applied, and is then moved into a second position in which the conical surfaces engage, the settle blow air passages are closed and the mould cavity closing surface portion of the baffle member closes the parison mould cavity.

This construction however suffers from certain disadvantages. To enable settle blow pressure to be built up, the baffle member must be a close fit with the parison mould members. With the repeated movement of the baffle member into and out of contact with the parison mould members wear inevitably takes place which allows the leakage of air and consequently reduces the available settle blow pressure.

It is an object of the present invention to provide a baffle assembly which may be used without a funnel but in which the settle blow air is not provided through the mould cavity end closing surface of the baffle assembly.

SUMMARY OF THE INVENTION

The present invention provides as one of its features a baffle assembly for use in a glassware forming machine to provide a settle blow to settle a gob in a parison forming mould cavity and a mould closing surface to close the mould cavity comprising a first member which comprises a baffle head having an end surface with a mould cavity closing surface portion and settle blow air passages opening to positions spaced from the mould cavity closing surface portion and adapted to be connected to an air supply and a second member which is cup shaped comprising an endmost circumferential locating surface, the cup shaped member being mounted on the first member for axial movement between a first position in which it extends past the end surface of the baffle head and a second position in which the endmost locating surface is substantially level with the end surface of the baffle head and means for urging the second member into its first position.

DETAILED DESCRIPTION OF THE INVENTION

There now follows a description, to be read with reference to the accompanying drawings, of two baffle assemblies embodying the invention.

In the accompanying drawings

Figure 1:
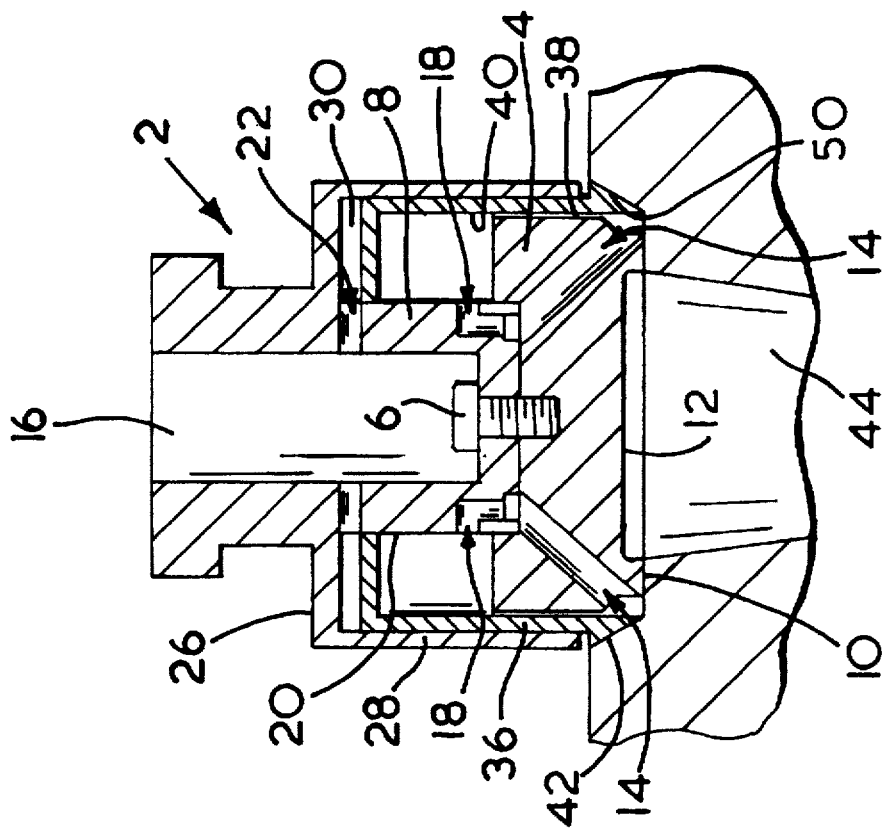
Figure 2:
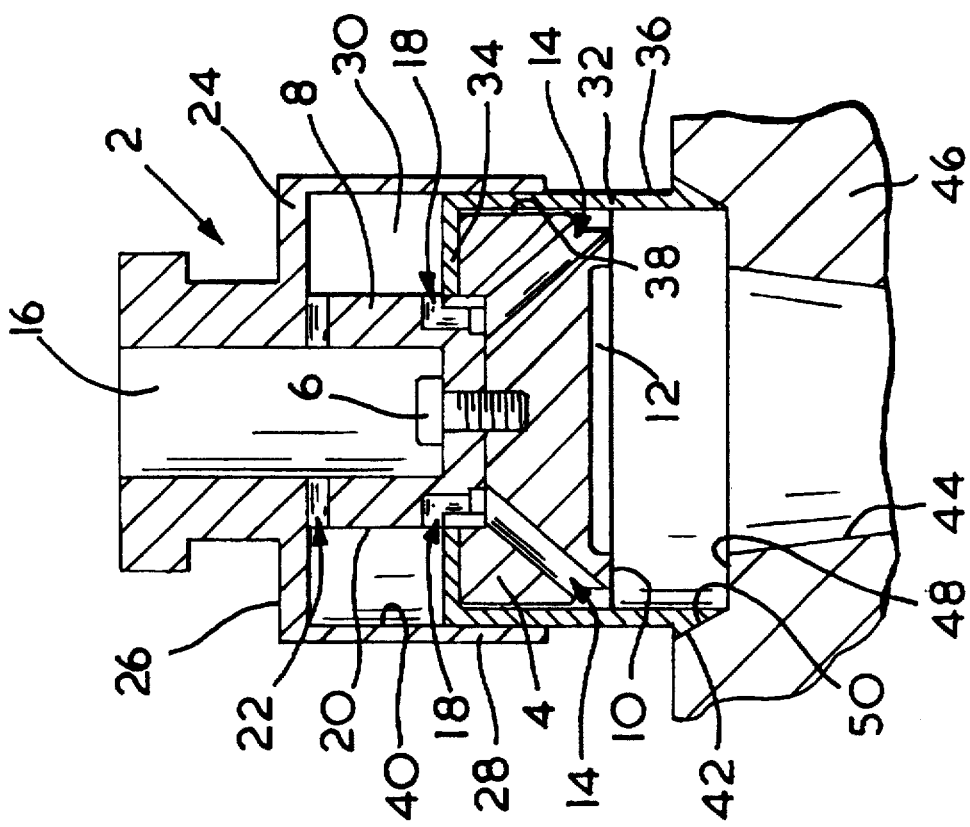
Figure 4:
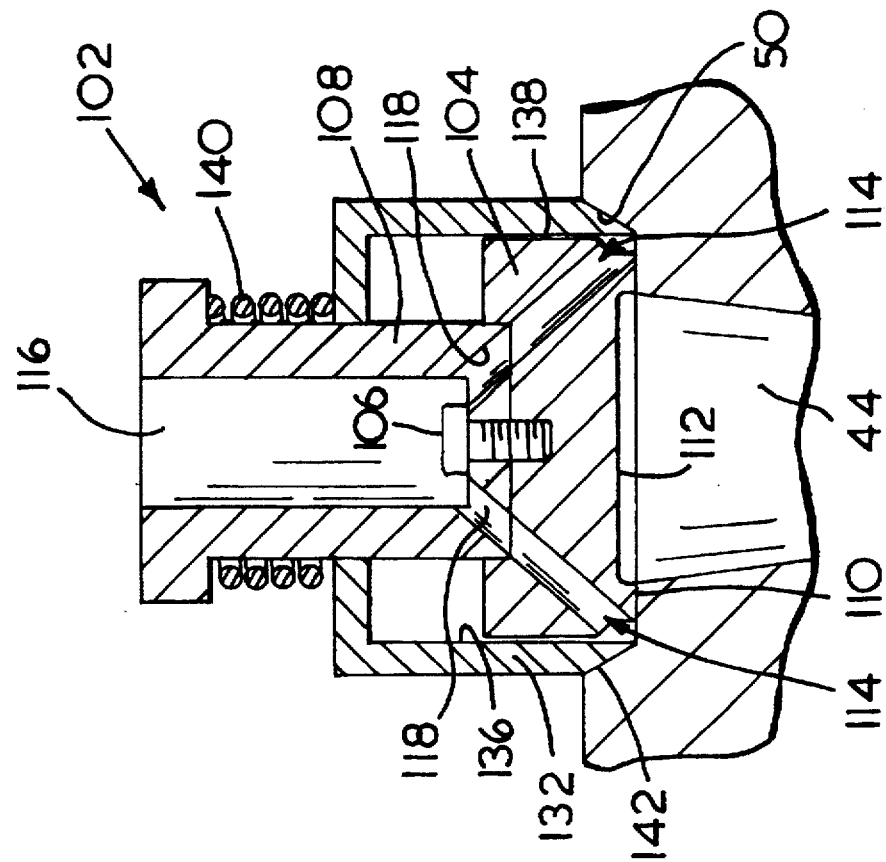
Figure 3:
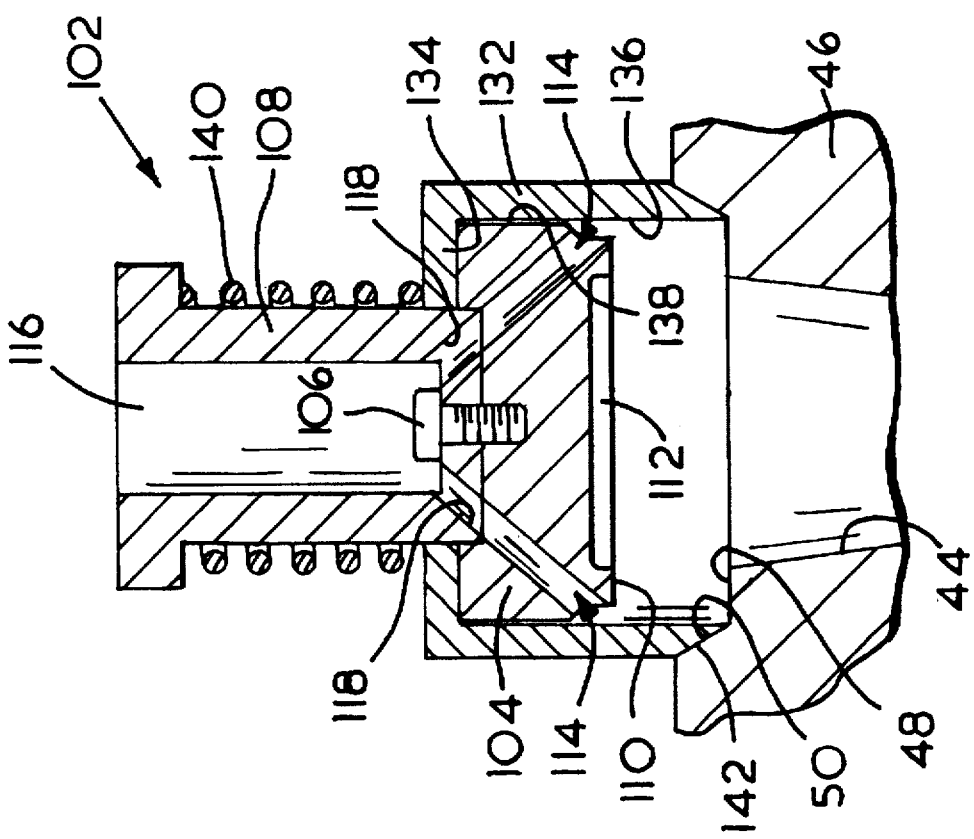

FIG. 1 shows a first baffle assembly embodying the invention in position against a parison mould to provide a settle blow FIG. 2 shows the first baffle assembly in position against the parison mould to provide a mould closing surface for the mould FIG. 3 shows a second baffle assembly embodying the invention FIG. 4 shows the second baffle assembly in a position corresponding to FIG. 2.

The first baffle assembly (FIGS. 1 & 2) comprises a first member 2 which comprises a baffle head 4 which is secured by a bolt 6 to a central column 8. The baffle head 4 has an end surface 10 which comprises a mould cavity closing surface portion 12, and a plurality (namely four) of settle blow passages 14 which open from an upper surface of the head 4 to circumferential positions on the head 4 spaced from the surface portion 12.

The column 8 of the first member 2 has an axial air passage 16 which is adapted to be connected to a supply of air under pressure (not shown), first, right angled, air passages 18 which lead from the settle blow air passages 14 to an outer surface 20 of the column 8, second, radial, air passages 22 spaced upwardly from the first air passages and leading from the outer surface 20 to the axial air passage 16, and a skirt member 24 which extends from the column 8 and comprises an annular base 26 and a cylindrical skirt 28 extending downwardly from the base around the column 8 to provide an annular air chamber 30.

The baffle assembly also comprises a second member 32 which is cup shaped comprising an annular base 34 which is slidably mounted on the column 8 and a downwardly extending cylindrical wall 36 which extends in slidable contact between a cylindrical outer surface 38 of the baffle head and a cylindrical inner surface 40 of the skirt 28. An endmost circumferential locating surface 42, which is part conical, is provided at a lower end of the wall 36.

The cup shaped second member 32 is movable between a first position (FIG. 1) and a second position shown in FIG. 2. In the first position the second member 32 extends past the end surface 10 of the baffle head 4. In this position the annular base 34 is positioned in contact with the baffle head 4, and the first air passages 18 open above the base 34 into the annular chamber 30 which is also in communication with the air supply through the radial air passages 22 and the axial air passage 16.

In the second position of the second member 32 the locating surface 42 is substantially level with the end surface 10, 12 of the baffle head 4 and the annular base 34 is positioned just below the first air passages 22.

When the baffle assembly is incorporated in a section of an I.S. machine for use in carrying out the blow and blow process, it is mounted on a baffle operating mechanism of the section (not shown) which moves it into and out of its operative position from an out-of-the-way position.

With the baffle assembly in its out-of-the-way position, a gob of glass is provided to a mould cavity 44 of a parison mould 46. The baffle assembly is then brought by the baffle operating mechanism into a first operative position over the mould cavity 44 of the parison mould 46. At this stage the second member 32 is partway between its first position, FIG. 1, and its second position, FIG. 2.

Conventional timing mechanisms of the section then provide a blast of settle blow air through the axial air passage 16. At this stage, the chamber 30 and the air passages 22 provide means for urging the second member 32 into its first position. The settle blow air, passing through the radial air passages 22 into the air chamber 30 acts against the member 32 and urges the member 32 into its first position: the baffle operating mechanism positions the baffle assembly at an appropriate height above the parison mould so that the locating surface 42 of the member 32 is located in a recess 48 also known as a top inner annular sealing surface of the parison mould, which recess 48 comprises a bevelled locating surface 50 also known as a top outer annular locating surface corresponding to the locating surface 42.

In this first position of the member 32 settle blow air is provided from the air passage 16, through the radial air passages 22, and the first air passages 18 to the settle blow passages 14 into the cavity 44 to force the gob of molten glass into contact with a lower, neckring portion, of the parison mould.

When the settle blow operation is completed, the timing mechanism terminates the flow of settle blow air into the passage 16. The pressurised air in the mould cavity is then allowed to exhaust through the passages 14, 18, the chamber 30, and the passages 22 and 16.

The baffle operating mechanism then moves the first member 2 downwardly, as shown in FIG. 2, until the second member 32 is in its second position. In this second position the mould cavity closing surface position 12 of the baffle head 4 closes the end of the parison mould cavity 44 so that air pressure can be exerted against the glass in the mould to mould the glass into a parison. It will be noted that the surface portion 12 provides a smooth end surface to the parison mould cavity, and the settle blow air passages 14, which at this stage open into the recess 48 of the parison mould radially outwards of the surface portion 12, will not contact the molten glass.

It will also be noted that in this second position of the member 32 air can no longer pass between the cavity 44 and the passage 16.

When the parison is formed, the baffle assembly is moved to its out-of-the-way position, the parison mould is opened, and the moulded parison is transferred on in the machine for a further forming operation.

The second baffle assembly (FIGS. 3 and 4) comprises a first member 102 which comprises a baffle head 104 secured by a bolt 106 to a central column 108. The baffle head 104 has an end surface 110 which comprises a mould cavity closing surface portion 112 and a plurality of settle blow passages 114 which open from an upper surface of the head 104 to circumferential positions on the head 104 spaced from the surface portion 112.

The column 108 of the member 102 has an axial air passage 116 which is adapted to be connected to a supply of air under pressure (not shown). Passages 118 in the column 108 connect the passage 116 to the settle blow passages 114.

The baffle assembly 102 also comprises a second cup shaped member 132 comprising an annular base 134 which is slidably mounted on the column 108 and a downwardly extending cylindrical wall 136 which is in slidable contact with a cylindrical outer surface 138 of the baffle head 104. An endmost circumferential locating surface 142 which is part conical is provided at a lower end of the wall 136. A compression spring 140 acts between the first member 102 and the cup shaped second member 132 to urge the member 132 into a first position as shown in FIG. 3. The cup shaped member 132 can be moved, against the action of the spring 140 into a second position shown in FIG. 4. In the first position the member 132 extends past the end surface 110 of the baffle head 104. In the second position of the member 132 the locating surface 142 is substantially level with the end surfaces 110, 112 of the baffle head 104.

The operation of the second baffle assembly is generally similar to that of the first baffle assembly. In the operation of the section, the baffle assembly 102 is brought, by the baffle operating mechanism, into a first operative position over the mould 46 the spring 140 urging the member 132 into its first position, and the baffle mechanism moving the baffle assembly downwards so that the locating surface 142 of the member 132 is located in the recess 48, contacting the bevelled surface 50.

With the baffle assembly in this position, as shown in FIG. 3, conventional timing mechanism causes a blast of settle blow air to be provided through the passage 106 and the passages 118, 114.

When settle blow is completed, the baffle operating mechanism then moves the member 102 downwards, compressing the spring 140, until the second member is in its second position (FIG. 4), and moulding of the parison is completed.

What is claimed is:

1. A baffle assembly for use in a glassware forming machine to provide a settle blow to settle a gob in a parison forming mould cavity having a top inner annular sealing surface and a top outer annular locating surface comprising a first member including a central column having an outer surface and upper and lower ends and an axial air passage communicating with said upper end and a baffle head secured to said lower end of said central column, said baffle head having a closing surface including an annular mould cavity end surface for engaging the top inner annular sealing surface of the mould and settle blow air passages opening outside of said annular mould cavity end surface, and a second cup shaped member dimensioned to surround said baffle head and including an annular bottom locating surface for engaging the top outer annular locating surface of the mould, said second cup shaped member being mounted on the first member for relative axial movement between, a first position in which said second member extends past the closing surface of the baffle head whereby said annular bottom locating surface of said second cup shaped member engages the top outer annular locating surface of the mould while said settle blow air passages communicate with the mould cavity, and a second position whereat said bottom annular locating surface of said second cup shaped member engages the top outer annular locating surface of the mould while said annular mould cavity end surface of said baffle head engages the top inner annular sealing surface of the mould to close the mould.

2. A baffle assembly according to claim 1, wherein said central column comprises first air passages connecting said settle blow air passages to said outer surface of the column, second air passages leading from the outer surface of said column to said central column axial air passage, and further comprising a third cup shaped skirt member dimensioned to surround said second cup shaped member and including a base secured to said central column above said first and second air passages and a cylindrical skirt secured to said base and extending downwards around the column to define an annular chamber with said central column and said second cup shaped member whereby the admission of air under pressure into said axial passage of said central column will enter said chamber to urge said second cup shaped member to said first position.

3. A baffle assembly according to claim 1, wherein said central column further comprises air passages for connecting said baffle head settle blow air passages to said central column axial air passage and an outwardly projecting flange at said upper end of said central column and further comprising a spring compressively located around said central column between said flange and said second cup shaped member.

\* \* \* \* \*